Patented Feb. 9, 1926.

1,572,425

UNITED STATES PATENT OFFICE.

HARRY C. FISHER, OF CINCINNATI, OHIO, ASSIGNOR TO THE RICHARDSON COMPANY, OF LOCKLAND, OHIO, A CORPORATION OF OHIO.

PROCESS FOR COLORING MINERAL MATTER.

No Drawing.　　　Application filed July 27, 1925.　Serial No. 46,491.

*To all whom it may concern:*

Be it known that I, HARRY C. FISHER, a citizen of the United States, and a resident of Cincinnati, in the county of Hamilton and State of Ohio, have invented certain new and useful Improvements in Processes for Coloring Mineral Matter, of which the following is a full, clear, and exact description.

My invention relates to the imposition of color upon granulated mineral matter, and more particularly granulated slate by the heat treatment upon previously granulated particles of a colored silicate which is colored during my process.

In my application for Patent Serial No. 45,133 filed July 21, 1925, I have described and claimed the kiln treatment of granulated slate, which has been coated with a water solution of sodium or potassium silicate together with a pigmenting body. In the present specification I will describe and claim the process of getting the proper coating on the granules prior to the kiln or roasting treatment.

The materials employed are granulated mineral, water, sodium or potassium silicate of 43° Baumé, or thereabouts, and preferably of a factor or ratio of $3SiO_2$ to $1Na_2O$, or with a greater $SiO_2$ content, and a pigmenting agent which may or may not be subject to chemical change, and hence color change, during the heating process, and which may or may not be water soluble. My process has particular importance, however, with relation to water insoluble pigments in finely divided form, and has been developed with relation to granulated slate such as is used as a surfacing for roofing.

My object is to obtain a uniform coating of the mineral with a solution of the silicate and with a uniform coating of the pigment also. The uniform pigment coating is of particular importance where the mineral is used as a surfacing material for roofing because the colored mineral is made up commercially in batches which are used on given runs on a roofing machine so that should the colors vary slightly in a batch the variations will show up quite glaringly in the final product which will be made up of shingles or rolls made in the runs of the roofing machine, and laid side by side on a roof. The final color obtained in following my process, particularly where pigments are employed which undergo a certain change under the influence of heat, is the product of many varying conditions and is particularly affected by the nature of the coating initially placed upon the granulated particles before the heat treatment is carried on. In this connection, I find that the order in which the color and binding agents are added to the slate is of the utmost importance.

The use of a previously colored water soluble silicate, so far as my experiments have gone, is not productive of the best results because of the fact that the color, that is to say, a finely divided pigment, exhibits a tendency to settle out when the silicate is dissolved, and this holds true for silicates colored when dissolved, as well as those which are colored during the original glass making process. It should be recalled that in my process I refer to operations upon a commercial scale rather than in the laboratory.

In following out the processes which I have developed for coloring mineral for roofing purposes, I have found that satisfactory results can be obtained by making a suspension of pigment in silicate in a mixer, diluting the silicate if necessary, and applying the preformed suspension to the granulated mineral. This process, however, has a number of disadvantages; inasmuch as it is sometimes difficult to secure an even coating of the granules, the depth of color varies in great measure as the thickness of the coating, and the effect of this variation is frequently heightened when pigments are used subject to a color change under the influence of heat, but which are to a marked degree protected from such color change by the silicate coating in proportion to its thickness. Again, as indicated above, there is a tendency for the color to settle out of such preformed suspensions, so that continuous agitation is necessary. Furthermore, if the suspension is too thick, there is a tendency for the granulated mineral matter to become cemented together by the silicate coating. This will result in the delivery of agglomerated balls of granules after the heat treatment instead of separated granules suitable for roofing purposes. If these balls of granules are crushed, unevenness of color results from the fact that the pigmented coating may be lacking on the sides of the granules which have formed parts of such agglomerated masses.

On the other hand, if the suspension is too thin, it will not adhere properly to the surface of the granules, permits the pigment to settle out too readily, and has a tendency to flow and collect in the bottom of the mixer in spite of agitation.

It is the purpose of this patent application to set forth a new and improved method of securing a coating on granular materials of a pigment suspended in silicate whereby all of the disadvantages enumerated above are eliminated.

I will describe as an illustration which holds good for a wide range of pigments, a process for making blue colored slate. The slate itself in granulated form will preferably, for the production of this color, be of a natural green or gray. A formula which will work out quite economically will employ granulated slate 500 lbs., water 19 lbs., sodium silicate 31 lbs. preferably of the factor given above, and ultramarine blue pigment 12 lbs.

In following out my improved process, the first step is to place the slate in a mixer, and pour in the pigment in a dry state, whereupon agitation is employed to mix the slate and the pigment. The slate is usually dry, although a certain percentage of moisture does no harm. The next step is to add a small part of the water and continue the agitation. Then the final step is to dissolve or dilute the silicate with the balance of the water and then to add the silicate solution to the mass and agitate it until the silicate is fully deposited as a surface coating on all granules.

It is best to use part of the water on the silicate and part on the mixed slate and pigment, although the use of all of the water on the mixed slate and pigment is permissible. An excess of water is, of course, to be avoided, as tending to wash the pigment off the slate or to delay the dehydrating process. The proportion of materials which I have given is not an exact essential, but is given as a minimum by the use of which regular and uniform results may be expected with minimum time for the kiln treatment.

After the slate has been coated with the pigment and the silicate in the manner indicated above, the mass is placed in a counterflow rotary kiln or a kiln with agitating and conveying means therein and by progressive heating and agitation brought to a condition in which the silicate is dehydrated and formed by heat treatment into a permanent weather resistant film, which is colored with the pigment. The temperature ranges and peculiarities of action of the silicate are set forth in my co-pending application, and do not require setting forth herein.

The effect of my process is, first, to secure, by the application of the dry pigment to the slate, an absolutely uniform distribution thereof over the slate surface which I find to be an essential in the securing of uniform colors on granulated mineral. The second step in which the water is added, has the effect of increasing the temporary adhesion of the pigment to the slate and, in a measure, of lubricating the granules. The subsequent application of the silicate in the third step coats the granules so as to cover the uniformly distributed pigment already on their surfaces, and it is diluted by the water so that there will be no tendency for the mineral granules to stick together. I am of the opinion also that my process results in a coated condition of the granules in which the pigment adheres fairly closely to the mineral surface and is covered by a uniform and comparatively thick coating of the silicate, rather than a condition in which the pigment is uniformly distributed throughout the silicate body. This overlying coating of silicate tends in considerable measure to protect the pigment from color changes due to heat.

As heretofore stated, I use the described method of coating the granules prior to kiln treatment, whether the pigment be soluble or insoluble in a water solution of silicate, and I wish to lay stress on the fact that my process has extreme value not only in obtaining a uniform product time after time, but in permitting the use of an economical amount of pigment, with as marked a resultant color as if a great excess were used.

Having thus described my invention, what I claim as new and desire to secure by Letters Patent, is:—

1. A process for permanently coating a granular mineral with a dehydrated colored silicate, which consists in mixing together dry mineral granules and dry coloring matter, and then adding water and silicate in the order named, accompanied by agitation, and finally dehydrating be heat.

2. A process for permanently coating a granular mineral with a dehydrated silicate which consists in mixing together dry mineral granules and dry finely divided pigment, then adding water and silicate accompanied by agitation and finally dehydrating by heat.

3. A process for permanently coating a granular mineral with a dehydrated silicate which consists in mixing together dry mineral granules and dry finely divided water insoluble pigment, then adding water and silicate accompanied by agitation and finally dehydrating by heat.

4. A process for permanently coating a granular mineral with a dehydrated silicate which consists in mixing together dry mineral granules and dry finely divided water insoluble pigment, then adding water and silicate in the order named, accompanied by agitation and finally dehydrating by heat.

HARRY C. FISHER.